United States Patent [19]

Gillies

[11] Patent Number: 4,831,442
[45] Date of Patent: May 16, 1989

[54] CONTROL CIRCUIT FOR A MEMORY ARRAY

[75] Inventor: David Gillies, Strasbourg, France

[73] Assignee: Deutsche ITT Industries GmbH, Freiburg, Fed. Rep. of Germany

[21] Appl. No.: 151,132

[22] Filed: Feb. 1, 1988

[30] Foreign Application Priority Data

Feb. 6, 1987 [EP] European Pat. Off. ........... 87101619

[51] Int. Cl.$^4$ .............................................. H04N 7/01
[52] U.S. Cl. ..................................... 358/140; 358/11; 358/160
[58] Field of Search ............... 358/140, 141, 166, 160, 358/11, 21 R

[56] References Cited

U.S. PATENT DOCUMENTS

| | | | |
|---|---|---|---|
| 3,898,378 | 8/1975 | Hinoshita et al. | 178/6.8 |
| 4,041,531 | 8/1977 | Bingham | 358/3.7 |
| 4,558,347 | 12/1985 | Pritchard | 358/166 |

FOREIGN PATENT DOCUMENTS

| | | |
|---|---|---|
| 0018856 | 11/1980 | European Pat. Off. |
| 0197165 | 10/1986 | European Pat. Off. |
| 0242413 | 10/1987 | European Pat. Off. |
| 3417139 | 11/1985 | Fed. Rep. of Germany |
| 2152782 | 8/1985 | United Kingdom |

OTHER PUBLICATIONS

"Design of a DPCM Codec for VLSI Realization in CMOS Technology", *Proceedings of the IEEE*, vol. 73, No. 4, Apr. 1985, by Peter Pirsch, pp. 592 through 598.
Elektrisches Nachrichtenwesen, "Videocodec fur die Breitbandubertragung", by P. Pirsch, 10/8/84, pp. 447 through 449.
"Applications of Picture Memories in Television Receivers", *IEEE Transactions on Consumer Electronics*, vol. CE-29, No. 3, 8/83, by Berkhoff, Kraus & Raven, 251-258.
"Composite Television Coding: Subsampling & Interpolation", *S.M.P.T.E. Journal*, vol. 91, No. 8, Aug. 1982, by Brainard, Netravali & Pearson, pp. 717-724.

*Primary Examiner*—Tommy P. Chin
*Attorney, Agent, or Firm*—Thomas L. Peterson

[57] ABSTRACT

A control circuit includes a data reduction decoder and an interpolating filter, the data reduction decoder having an line memory for the video signal included in a scanning line. The interpolating filter cooperates with the line memory and includes a first adder, a subtracter, a first and a second multiplier, and a second adder. The control circuit controls the writing of digital signals of a field corresponding to any of the conventional television standards into a memory array and the readout of digital signals at an increased field rate, preferably at twice the field rate.

2 Claims, 1 Drawing Sheet

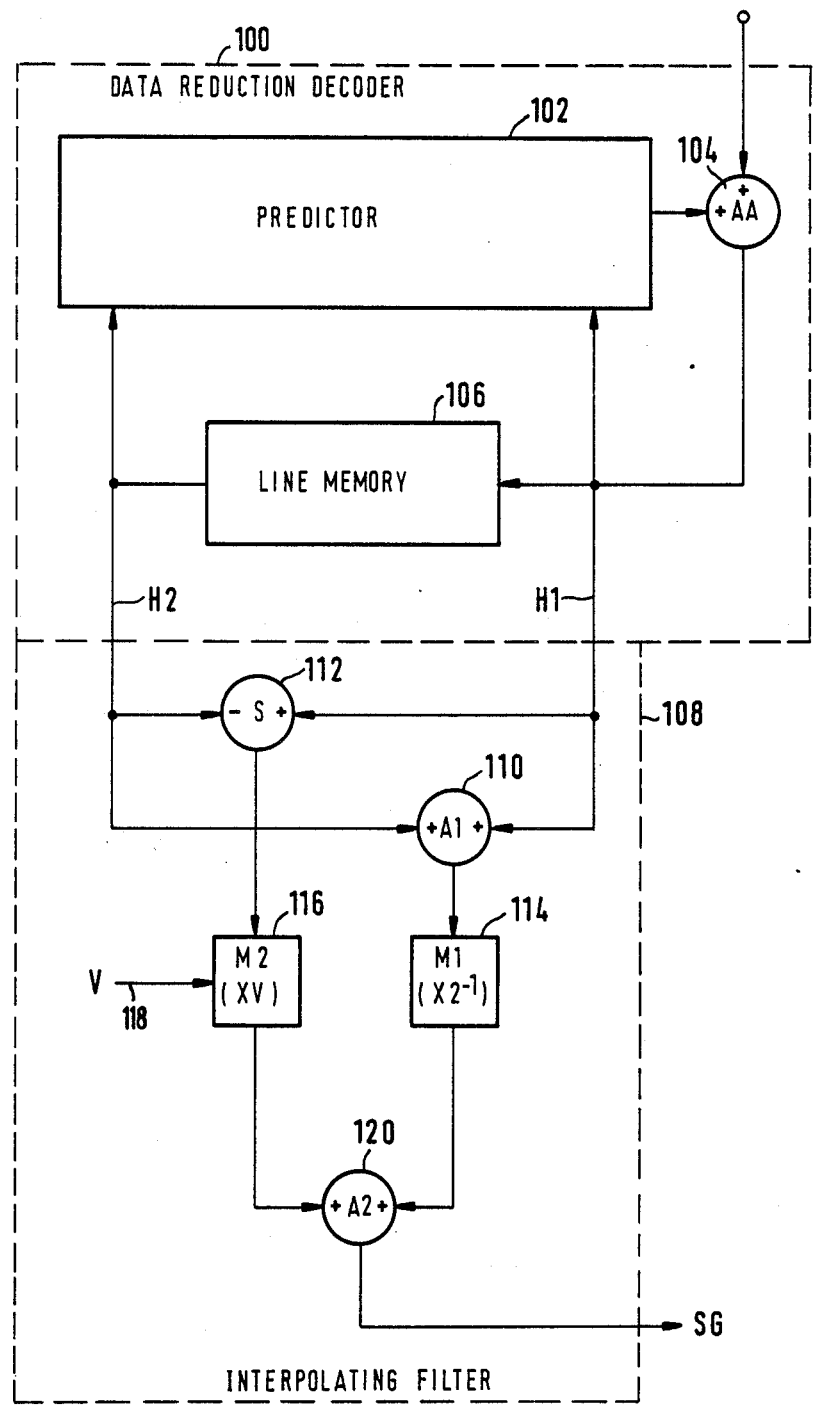

CONTROL CIRCUIT FOR A MEMORY ARRAY

BACKGROUND OF THE INVENTION

1. Field of the Invention

The present invention relates to a control circuit for a memory array which receives digital signals of a field conforming to any of the conventional television standards and delivers them at an increased field rate, preferably at twice the field rate. The memory array thus serves to produce a flicker-free picture on the screen of a television receiver for conventional television standards, such as PAL or SECAM or NTSC in the respective variants. By reading the signals out of the memory array at an increased field rate and, of course, an increased line rate, large area flicker and line flicker are reduced considerably.

2. Description of the Prior Art

If commercially available random-access memories (RAMs) of 256 kilobytes, i.e., $2^{18}$ bits, are used to store a television field, several such RAMs are necessary. Thus, their number must be reduced to a justifiable measure by carrying out a data reduction prior to the storage, which must be followed by a corresponding increase after readout from the memory array.

Circuits suited for this purpose are described, for example, in Offenlegungsschrift DE 34 17 139 A1, in the pre-published Patent Application EP-A 197 165, in the prior European Application 86 10 5444.3, and the periodicals "ICC '84 Links for the Future", *IEEE International Conference on Communications*, 1984, Vol. 1, pp. 250-255, "Proceedings of the IEEE", 1985, pp. 592-598, and "Elektrisches Nachrichtenwesen", 1984, pp. 447-449. The data reduction encoder and the data reduction decoder each have a line memory for the video signal included in a scanning line.

SUMMARY OF THE INVENTION

The control circuit in accordance with the invention ensures, among other things, that, if the stored field is read out of the memory array at twice the write-in rate, for example, if it is read out twice, the second readout takes place in such a way that the field fits correctly into the spaces between the line of the first field, so that the frame produced consists again of two interlaced fields, which however, correspond to only one transmitted field. This is accomplished by means of the interpolating filter defined in the claim. Since this interpolating filter must operate with a line memory, too, it is an essential aspect of the invention to use the existing line memory in the data reduction decoder. The control circuit thus includes only a single line memory, which results in a considerable decrease in the area occupied by the control circuit on an integrated-circuit chip.

BRIEF DESCRIPTION OF THE DRAWING

The invention will now be explained in greater detail with reference to the accompanying drawing, in which the single figure is a schematic circuit diagram of an embodiment of the invention.

DETAILED DESCRIPTION

A data reduction decoder 100 is shown only schematically for the purpose of this description and comprises subcircuits including a predictor 102, an adder (AA) 104, and a line memory 106, which are interconnected as shown.

An interpolating filter 108 cooperates with the line memory 106 in the manner described below. It includes a first adder (A1) 110, whose two inputs are connected to the input and the output, respectively, of the line memory 106, and a subtracter (S) 112, whose minuend (+) and subtrahend (−) inputs are connected to the input and the output, respectively, of the line memory 106.

The output of the first adder (A1) 110 is coupled to the input of a $2^{-1}$ (i.e., 0.5) multiplier (M1) 114. The output of the subtracter (S) 112 is coupled to one input of a multiplier (M2) 116. The multiplier (M2) 116 has a second input that is fed with a presettable signal V on a line 118 having an absolute value which lies between zero and one. The value of the signal V is provided in such a way that it has a positive value that is effective during one field, has a corresponding negative value during the next field, and has the positive value again during the next field but one. A second adder (A2) 120 has first and second inputs that are connected to the output of the $2^{-1}$ multiplier (M1) 114 and the output of the multiplier (M2) 116, respectively. The output of the second adder 120 provides the output signal SG.

The signals appearing at the inputs of the subtracter (S) 112 and the first adder (A1) 110 during a line are designated H1, H2, respectively, which correspond to the signals of two successive lines. The output signal SG is given by:

$$SG = H1(0.5 + V) + H2(0.5 - V).$$

When the absolute value of V is greater than 0.5, i.e., +0.6, for example, the output signal SG will exhibit a more or less strong peaking effect, which results in the known characteristics of the picture on the screen. When the absolute value of V is less than 0.5, no peaking effect will be produced.

What is claimed is:

1. An interpolating filter for use in combination with a line memory in a data reduction circuit of a television receiver, said line memory having an input for receiving digital video signals of a scanning line of a field corresponding to any of the conventional television standards and an output for generating delayed digital video signals corresponding to said received video signals, said interpolating filter receiving said video signals at said input and output of said line memory and delivering an output signal at an increased field rate, said interpolating filter comprising:

a first adder having a first and a second input connected to the input and the output, respectively, of said line memory;

a subtracter having a minuend input and a subtrahend input connected to the input and the output, respectively, of said line memory;

a first multiplier having an input and an output, said input of said first multiplier connected to the output of said first adder, and said output having a value of one-half said input;

a second multiplier having a first and a second input and an output, said first input of said second multiplier connected to the output of said subtracter, and said second input of said second multiplier provided with a presettable input signal having an absolute value between zero and one, said presettable input signal having a positive value that is effective during one field, a corresponding negative value during the next field, and the positive value again during the next field but one; and a second adder having a first and a second input and an output, said first and second inputs of said second adder connected to the output of said first multiplier and the output of said second multiplier, respectively, and said output of said second adder providing said output signal.

2. The interpolating filter as defined in claim 1, wherein said output signal is related to said input and output of said line memory in accordance with the following:

$$SG = H1(0.5+V) + H2(0.5-V),$$

where SG is the output signal, H1 is the input of said line memory, H2 is the output of said line memory and V is said presettable input signal to said second multiplier.

* * * * *